Sept. 7, 1954     H. G. LYKKEN     2,688,478
APPARATUS FOR REDUCING AND SMELTING ORE, PRODUCING
GAS, AND GENERATING POWER Filed April 4, 1949     2 Sheets-Sheet 1

INVENTOR.
HENRY G. LYKKEN
BY
Paul, Paul & Moore
ATTORNEYS

Patented Sept. 7, 1954

2,688,478

UNITED STATES PATENT OFFICE 2,688,478

APPARATUS FOR REDUCING AND SMELTING ORE, PRODUCING GAS, AND GENERATING POWER

Henry G. Lykken, Minneapolis, Minn.

Application April 4, 1949, Serial No. 85,446

3 Claims. (Cl. 266—32)

This invention relates to method and apparatus for reducing and smelting ores, particularly finely-divided iron ore and of simultaneously producing carbon monoxide gas and power. In the iron ore producing regions, particularly northern Minnesota and elsewhere, there has been accumulated over the years large stock piles of ore in finely divided condition which is of little commercial value because it cannot be used conveniently in the normal blast furnace operation. These ores of fine particle size are also produced in many ore beneficiating operations, wherein the ore must necessarily be ground to fine size in order to permit the ore to be separated from adherent gangue. In utilizing such finely-divided ores or concentrates, it has been necessary to produce ore agglomerates by sintering together the relatively fine particles into larger masses of sufficient strength, porosity and size so as to permit their use in the ordinary blast furnace. Such sintering and agglomerating processes require heat and power, and hence in order to use finely-divided ores it has been necessary to charge against such ores the cost not only of any beneficiation which may be carried out on the ore, but also the cost of agglomerating, briquetting and sintering.

It is an object of the present invention to provide methods and apparatus for reducing and smelting finely-divided ores without the necessity of agglomerating or briquetting said ores prior to the reduction and smelting.

It is a further object of the invention to provide improved methods and apparatus for reducing and smelting finely-divided ore and of simultaneously producing large amounts of carbon monoxide gas and power.

It is also an object of the invention to provide methods and apparatus for reducing and smelting finely-divided ore utilizing available lignitic carbonaceous material and pulverized calcium oxide flux, which are preferably introduced simultaneously with the ore blast.

It is a further object of the invention to provide an improved method of reducing and smelting finely-divided ores, particularly iron ore at low cost and of providing large amounts of carbon monoxide gas at low cost, which may be utilized for ore beneficiation and for direct sale and to provide simultaneously large amounts of power at economical cost.

Other and further objects of the invention are those inherent in the apparatus herein illustrated, described and claimed.

Figure 1:
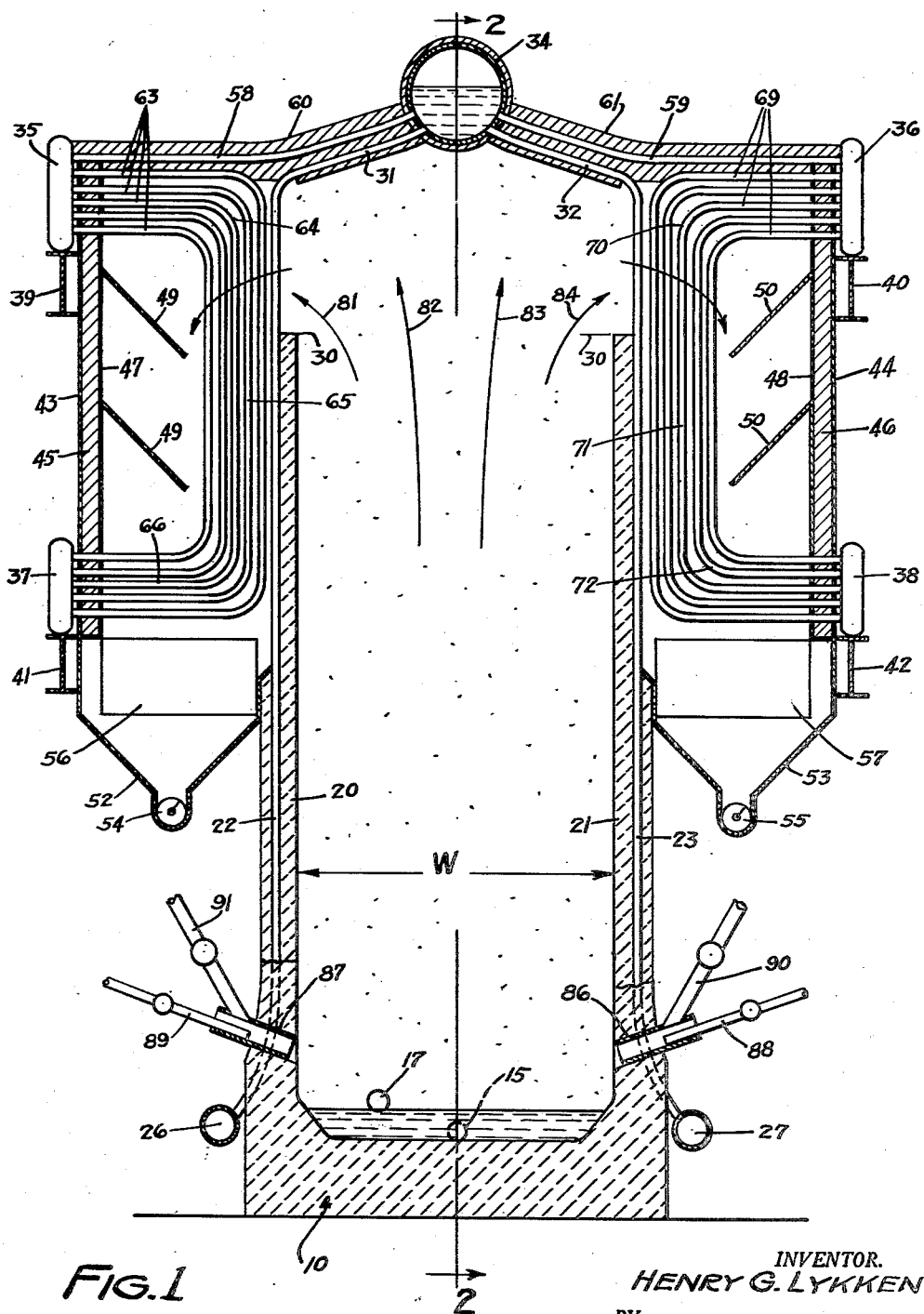
Figure 2:
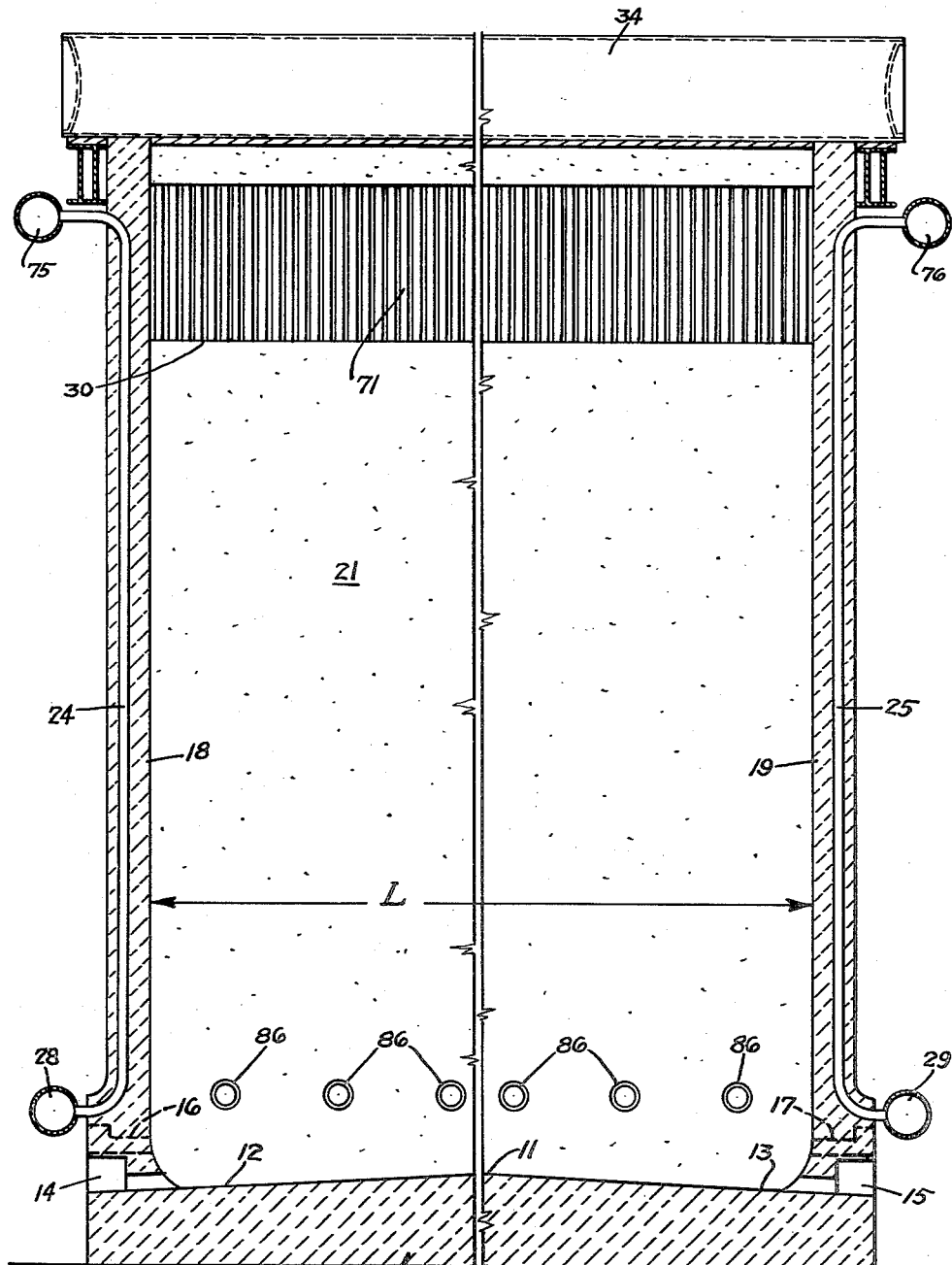

The invention is illustrated with reference to the drawings in which corresponding numerals refer to the same parts and in which Figure 1 is a vertical cross sectional view transversely through the apparatus of the invention for reducing and smelting finely-divided ores and simultaneously producing large quantities of carbon monoxide gas and power;

Figure 2 is a longitudinal sectional view, taken on the line and in the direction of arrows 2—2 of Figure 1.

The methods of the invention can best be explained with reference to the apparatus of the invention to which attention is now directed.

Referring to the drawings the preferred apparatus of the invention is a combined reducing and smelting hearth furnace of preferably rectangular, horizontal section, the furnace being so constructed that the combustion space above the hearth is relatively large. The furnace is also designed so that the gases produced in the hearth are permitted to rise therein and since these gases are produced at high temperatures, the combined reducing and smelting furnace or hearth and gas producer is also provided with heat absorption surface for absorbing the sensible heat of the carbon monoxide gas produced in the furnace and converting said heat into available power in the form of high pressure steam.

Referring to the drawings the furnace or hearth consists of a base 10 of preferably rectangular plan having a width W and a length L. The base 10 is provided with a raised central portion 11 and is sloped off to the ends 12 and 13, and at each end is provided with a tap opening, as at 14 and 15, for drawing off the smelted metal and slag. The slag tap openings 16 and 17 are preferably arranged slightly spaced from the metal tap openings and at a more elevated position in the hearth wall so as to permit the slag to be drawn off separately from the metal. Above the hearth the end walls 18 and 19 and the side walls 20 and 21 rise to a distance approximately three and one-half to four times the width of the hearth. These walls are preferably provided with heat absorbing, steam generating boiler tubes at 22, 23, 24 and 25 which serve not only mechanically to support the refractory material, of which the walls are composed, but also to cool the walls and simultaneously to generate steam. At the base of the hearth there are provided headers 26 and 27, to which the banks of tubes 22 and 23, respectively, are connected at their lower end. Similarly, at the ends of the hearth there are provided headers 28 and 29 to which the banks of tubes 24 and 25, respectively, are attached. The hearth walls 20 and 21 terminate at the level 30 and above this level the tubes 22 and 23 continue exposed and at their upper ends are slanted in at 31 and 32 where they are connected to the steam drum 34. The upper part of the hearth is in the form of a water tube boiler having the headers 35, 36, 37 and 38, the headers being adequately supported upon the framing 39, 40, 41 and 42. The outer shell of the furnace is defined by the walls 43 and 44 of sheet metal which are provided with an insulating core at 45 and 46, together with an inner sheet metal supporting wall 47 and 48. Baffles are provided at 49—49 at the left-hand side of the heat absorbing part of the hearth, Figure 1, and similar baffles are provided at 50—50 at the right-hand side, as shown in Figure 1. The walls 43 and 44 extend downwardly and form dust-collecting hoppers at 52 and 53, these hoppers being provided with worm screws 54 and 55, by means of which dust collected in the hoppers is withdrawn axially of the screw and out of the furnace. At the ends of the hoppers are openings 56 and 57 which lead to stack breechings for drawing off the gases produced in the hearth. From the drums 35 and 36 there extend a bank of tubes at 58 and 59 which form the top of the furnace and connect to the steam drum 34. The tubes serve to support the refractory top wall 60—61 of the furnace. The wall 60 connects to the vertical wall composed of the components 43—45—47 at the left-hand side of the smelting furnace and boiler arrangement and the wall 61 connects to the right-hand vertical wall 44—46—48, at the right hand side of the furnace, also as shown in Figure 1. In this manner the upper part of the combined hearth, gas-producer and steam-producer is closed off so as to prevent the escape of the valuable combustible gases (principally carbon monoxide) which are produced in the arrangement. From the header 35 there also extends a bank of tubes 63 which have a horizontal run toward the center of the furnace and then curve downwardly in the region 64 and thence have the vertical run at 65 and thence extend outwardly in the region 66 and are joined to the lower drum 37. Similarly, from the drum 36 there extends a bank of tubes 69 which extend horizontally inwardly towards the hearth and thence at the region 70 bend downwardly and extend vertically at 71 until reaching the region 72 where this bank of tubes again extends outwardly and are connected to the lower drum 38. The drums 26, 27, 28 and 29 are connected together at the corners of the furnace and are also connected to the drums 37 and 38 by connecting headers not illustrated. Referring to Figure 2, the bank of tubes 24, which in part form one end wall of the hearth, are connected at their lower ends to the header 28 and are curved outwardly and connected at their upper ends to the header 75. Similarly, the bank of tubes 25, which in part forms the end-wall 19 of the hearth, are connected at the lower end to the header 29 and are bent outwardly and at their upper ends are connected to the header 76. The headers 75 and 76 are connected by passageways, not illustrated, to the headers 35 and 36 forming a ring header at the top of the boiler.

By this arrangement the gases produced within the hearth are caused to rise centrally of the hearth area between the walls 20 and 21, as illustrated by the arrows 81, 82, 83 and 84. The gases give up part of their heat to the banks of tubes 22—23—24—25 forming the lower walls of the hearth and then pass through and down parallel to the banks of tubes at 65 and 71 where additional heat is given up to these tubes. The baffles 49 and 50 serve to cause the gases to traverse the tubes and to eddy about the tubes, thus facilitating the heat transfer to the boiler tubes. Finally the gases pass out through the banks of tubes at 66 and 72 and thence into the hoppers 52 and 53 which also serve as breechings, whereupon the gases are delivered through the outlet ports 56 and 57 to gas collection or utilization apparatus.

In the lower side walls 20—21 of the hearth there are set a plurality of tuyères 86 and 87, these tuyères being set at an angle so that the combustible gas blast entering into the hearth through the tuyères blasts downwardly upon the bath of molten metal and slag in the bottom of the hearth. The tuyères 86 and 87 are distributed along the walls of the furnace so as to provide an even introduction of fuel, ore and finely-divided flux. Each tuyère is provided with an air or oxygen inlet as at 88 for tuyères 86, and 89 for tuyères 87. Into the tuyère tubes 86 and 87 there is also provided an inlet channel 90 for tuyères 86, and 91 for tuyères 87, through which finely-divided ore, lignite char, and flux is adapted to be introduced.

*Preferred method of operation*

In carrying out the method of the invention there is employed finely-divided ore, preferably ore which has been beneficiated so as to contain 50% or more of iron. The ore can be of any degree of fineness available and the fine ore particles are an advantage because they heat more rapidly than the larger particles. With the ore there is mixed finely-divided carbon fuel, preferably lignitic char of finely divided character and finely pulverized calcium oxide flux, all of which are preferably dry and thoroughly mixed in the desired proportions stated below. These are introduced into the hearth of the furnace through the tuyères by means of a blast of oxygen which is introduced through the blast pipes 88 and 89. The finely divided solid ingredients, viz. the finely pulverized ore, pulverized carbon fuel (preferably pulverized lignitic char) and finely pulverized calcium oxide are introduced through the tubes 90 and 91 into the tuyère tubes and the blast of oxygen serves to blow these finely-divided ingredients directly into the hearth. The amount of oxygen introduced through the pipes 88 and 89 is in the exact proportion to maintain a carbon monoxide atmosphere throughout the furnace. The use of multiple tuyères 86 and 87 along opposite sides of the hearth serve to effect a dispersal of all of the ingredients over and close to the surface of the molten bath in the base of the hearth. Adequate carbon and oxygen is used with the ore to maintain a temperature in excess of 2700° F. to effect reduction and melting of the ore and gangue above and at the surface of the bath. In the event carbon is absorbed in the molten iron at the base of the hearth, additional iron oxide may be introduced so as to reduce the carbon content, or the oxygen that is introduced into the furnace may be increased so as to burn out part of the carbon. For the ore constituent which is thus introduced into the hearth there may be utilized partially reduced ore or ore reduced to its metallic state in pulverized form. The metal and the slag thus produced in the hearth is withdrawn from time to time as in the standard blast furnace.

Based upon a 60% iron content as iron magnetite, a total of 2344 pounds of carbon is indicated for each 2000 pounds of metallic iron. Of this amount of fuel only 340 pounds or approximately 23% is required for reducing and smelting the ore. The bulk of the fuel introduced, viz. approximately 1800 pounds or approximately 77% less radiation and other heat losses appears as recoverable heat, largely as carbon monoxide gas. Thus, with such proportions of ingredients, approximately 3400 pounds of carbon monoxide gas having a heat value of upwards of 24,000,000 B. t. u. and containing approximately 2,200,000 B. t. u. sensible heat is produced, the sensible heat being recovered in the steam generator portion of the furnace. The amount of pulverized fuel that is introduced with the pulverized ore and pulverized calcium oxide flux may be varied above and below the proportions above stated, it being understood that if more heat is required, more fuel and oxygen may be introduced and the amount of carbon monoxide thus produced will also be increased. This is no disadvantage where the gas so produced has a salable market in the vicinity of the mill. In any event the amount of gas produced and the sensible heat of the thus produced gas is a valuable constituent and has a high market value.

The smelting furnace is thus characterized as a combination of ore reducing and smelting furnace, carbon monoxide gas producer and steam generator. It is built, preferably with a rectangular hearth, the width W being any width desired for best flame coverage and material distribution, and the length L of any length desired for the capacity of the furnace. The furnace is fired at multiple ports or tuyères at each side wall and may be tapped at either or both end walls.

Above the hearth portion the furnace is constructed essentially as a boiler furnace, as previously described, having water cooled walls throughout a portion of the furnace to obviate excessive temperatures of the refractory lining. The furnace proper is extended to such a height that it provides a top inlet to a tube bank of steam generator units along each side wall with a dust chamber and cooling gas outlet below each steam generator. The temperature of the carbon monoxide produced in the hearth will be approximately 2700° F. and is preferably removed at relatively low velocities into and through the tube bank as indicated.

The process carried out in the hearth requires approximately 2400 pounds of oxygen per 2000 pounds of iron. With this amount of oxygen input to the furnace and utilizing approximately 2345 pounds of carbon per 2000 pounds of metallic iron introduced as ore, there is produced more than ample heat and power for adjacent mining operations, crushing, grinding the ore, magnetic roasting or other means of concentration and for generating oxygen utilized in the ore smelting and reducing hearth, and other plant requirements. By reducing and smelting the ore at relatively high temperatures, viz. 2700° F., some or all of the sulphur and phosphorus pass off as vapor. By utilizing lignitic char as the fuel the ash therein contained, particularly where the lignitic char is produced from North Dakota lignite, acts as a material fluxing agent in the bath of the hearth. The use of very finely divided ore, fuel and flux produces a very rapid reaction closely adjacent the tuyères and immediately above the bath in the hearth, with gasification and/or liquefaction of all the ingredients so little or no dust is carried upwardly by the gases. Any dust that is carried over can be effectively removed in the gas breechings 52 and 53 below the boiler tubes with additional shake out chambers as may be required.

As many apparently widely different embodiments of this invention may be made without departing from the spirit and scope thereof, it is to be understood that I do not limit myself to the specific embodiments herein.

What I claim is:

1. A furnace having a rectangular horizontal plan and substantially greater length than width, a hearth at the base of the furnace, furnace walls formed integrally with the hearth and extending upwardly therearound so as to form an upright vertical furnace space having substantially the same rectangular plane of the hearth, the hearth walls being provided with tap openings at two levels, tuyères extending through the furnace walls slightly above the hearth level slanted downwardly towards the hearth, said tuyères being through the walls of the furnace having the longest dimension, a header outside the furnace walls below the tuyères, boiler tubes extending upwardly in spaced relation through the walls of the furnace having the greatest length, openings in said walls adjacent the top of the furnace, a top wall across the furnace and extending outwardly beyond the long walls of the furnace and outwardly over said openings and enclosures connected to said outwardly extending portions of said top wall around said openings, each enclosure having an outlet, said boiler tubes extending vertically in spaced relation across said openings and thence along the top wall to the center thereof, a header along the median center line of the top wall of the furnace to which the tubes are connected.

2. The apparatus of claim 1 further characterized in that it has a plurality of secondary headers along the walls of said enclosures above and below said openings and boiler tubes connected to such secondary headers and extending through said enclosure.

3. A furnace comprising a hearth of rectangular plan at the base thereof, said hearth having sides and ends, said hearth being provided with a floor sloping downwardly towards the ends thereof, walls extending upwardly from the edges of the hearth at the sides and ends so as to form a furnace enclosure, said walls being provided with tap holes at two levels, a plurality of tuyères in opposite furnace walls slightly above the hearth and directed downwardly through the walls towards the hearth, openings in the upper parts of the walls along opposite sides of said furnace extending substantially from end to end adjacent the top of the furnace, a top wall extending between the side walls across the top of the said furnace and outwardly from said openings, other walls extending downwardly from said top wall forming enclosures outside the furnace walls around said openings, said enclosures being provided with openings in the lower parts thereof, vertical boiler tubes embedded at spaced intervals in the walls of the furnace and extended across said furnace wall openings, thence across the top of said furnace, a header along the median center line of the top wall of the furnace to which the vertical boiler tubes are connected and additional boiler tubes extending through said enclosures.

References Cited in the file of this patent

UNITED STATES PATENTS

| Number | Name | Date |
|---|---|---|
| 68,566 | Hendrickson et al. | Sept. 3, 1867 |
| 432,280 | Nenninger | July 15, 1890 |
| 555,961 | Lungwitz | Mar. 10, 1896 |
| 564,512 | Fehrenbatch | July 21, 1896 |
| 635,652 | Canavan | Oct. 24, 1899 |
| 916,495 | Seymour | Mar. 30, 1909 |
| 975,998 | Resinelli | Nov. 15, 1910 |
| 1,090,574 | Shannon | Mar. 17, 1914 |
| 1,164,653 | Klepinger et al. | Dec. 21, 1915 |
| 1,259,467 | Cavers | Mar. 12, 1918 |
| 1,490,012 | Kapteyn Jr. | Apr. 8, 1924 |
| 1,693,916 | De Bethune | Dec. 4, 1928 |
| 2,034,071 | Wickland | Mar. 17, 1936 |
| 2,035,550 | Karwat | Mar. 31, 1936 |
| 2,182,128 | Kuzell | Dec. 5, 1939 |
| 2,195,274 | Ferguson | Mar. 26, 1940 |
| 2,365,194 | Hodson et al. | Dec. 19, 1944 |
| 2,550,676 | Dalin | May 1, 1951 |